(12) United States Patent
Stout

(10) Patent No.: US 7,188,568 B2
(45) Date of Patent: Mar. 13, 2007

(54) SELF-PROPELLED VEHICLE FOR MOVEMENT WITHIN A TUBULAR MEMBER

(75) Inventor: John Hugo Stout, Buckeye, AZ (US)

(73) Assignee: Arizona Public Service Company, Phoenix, AZ (US)

( * ) Notice: Subject to any disclaimer, the term of this patent is extended or adjusted under 35 U.S.C. 154(b) by 0 days.

(21) Appl. No.: 11/169,440

(22) Filed: Jun. 29, 2005

(65) Prior Publication Data

US 2007/0000406 A1 Jan. 4, 2007

(51) Int. Cl.
*B61B 13/10* (2006.01)

(52) U.S. Cl. .................... 104/138.2; 73/866.5

(58) Field of Classification Search ........... 104/138.2; 73/865.8, 866.5; 305/160; 474/204, 205
See application file for complete search history.

(56) References Cited

U.S. PATENT DOCUMENTS

| | | | | |
|---|---|---|---|---|
| 3,125,464 | A | * | 3/1964 | Harmes ...................... 118/105 |
| 4,085,808 | A | * | 4/1978 | Kling .......................... 175/94 |
| 4,112,850 | A | * | 9/1978 | Sigel-Gfeller ............ 104/138.2 |
| 4,722,001 | A | | 1/1988 | Rohrich et al. |
| 4,770,105 | A | | 9/1988 | Takagi et al. |
| 4,862,808 | A | | 9/1989 | Hedgcoxe et al. |
| 5,018,451 | A | | 5/1991 | Hapstack |
| 5,209,705 | A | | 5/1993 | Gregg |
| 5,565,633 | A | | 10/1996 | Wernicke |
| 6,322,172 | B2 | * | 11/2001 | Lussier ....................... 305/160 |
| 6,427,602 | B1 | | 8/2002 | Hovis et al. |
| 2004/0173116 | A1 | | 9/2004 | Ghorbel et al. |

OTHER PUBLICATIONS

"Crawler System Extends Riser Reacg" OilOnline—The Original Online Source for the Oil Industry, http://oilonline.com/news/features/aog/20041115.Crawler_.16391.asp, Feb. 9, 2005.
"Micro VGTV" Inuktun, Variable Geometry, Remotely Operated, Confined Space Video Inspection System, http://www.inuktun.com/micro-vgtv.htm, Feb. 9, 2005.
"Eagle PD: Belt and Sprocket System" Goodyear Power Transmission Products, http://www.goodyearindustrialproducts.com/powertrainsmission/products/prod-eaglepg.html, Feb. 9, 2005.

* cited by examiner

*Primary Examiner*—Lars A. Olson
(74) *Attorney, Agent, or Firm*—Meschkow & Gresham, PLC

(57) ABSTRACT

A self-propelled vehicle (20) for movement within a tubular member (22) includes propulsion mechanisms (28) distributed about a core element (24). Each of the propulsion mechanisms (28) includes a drive belt (28). A first pulley (34), a second pulley (36), and a mid-roller assembly (38) are encompassed by and engage the drive belt (28). The mid-roller assembly (38) is spring-loaded for providing an outwardly-directed force (40) to an underlying portion (42) of the drive belt (28) to press the drive belt (28) against an inner wall (44) of the tubular member (22). A motor arrangement (46), in communication with the propulsion mechanisms (28), actuates one of the first and second pulleys (34, 36) to rotate the drive belt (28) in contact with the inner wall (44) of the tubular member (22) thereby moving the vehicle (20) within the tubular member (22).

21 Claims, 10 Drawing Sheets

SELF-PROPELLED VEHICLE FOR MOVEMENT WITHIN A TUBULAR MEMBER

TECHNICAL FIELD OF THE INVENTION

The present invention relates to the field of self-propelled vehicles. More specifically, the present invention relates to a self-propelled vehicle adapted to travel through tubular members, such as pipes, and navigate bends and inclines within the tubular members.

BACKGROUND OF THE INVENTION

Pipelines can develop flaws over time. If left uncorrected, such flaws may eventually result in catastrophic failure of the pipeline. Such a catastrophic failure may result in lost services and revenues, and possible environmental damage. Because a pipeline may fail without warning, early detection of flaws is fundamental to preventing catastrophic failure.

A wide variety of pipe inspection systems that carry or draw inspection equipment through a pipeline are known. These inspection systems, generally referred to as pipe crawlers, pipe inspection pigs, and the like, are used for inspecting the interior walls of piping systems for damaged or flawed structural features. These pipe inspection systems can be propelled through a pipeline by pipeline flow, by manually drawing the inspection system through the pipe with cables and winches, and/or by self-propelling mechanisms.

The mechanics of passing an inspection system through a pipeline present several problems. For example, a problem that exists in some inspection systems is that they contain components that are unable to negotiate sharp bends or junctions. These systems are therefore unsuitable for use with convoluted pipelines. In addition, an inspection system that is unable to negotiate the bends and junctions in a pipeline is likely to become jammed in the pipeline. If an inspection system becomes stuck within a pipeline, then the system itself becomes a "flaw" (i.e., a blockage) of the pipeline, necessitating repair.

Inspection systems that are propelled by pipeline flow are not always appropriate in particular situations. For example, pressure or flow propulsion may not be adequate for severely leaking pipes, and cannot be used in empty pipes.

For inspection systems that are pulled through a pipeline by a towline, the towline may produce a significant amount of friction. For example, it takes considerable force to simply drag a half-inch steel cable through a two-kilometer steel pipeline. In addition, the cable poses a significant hazard to the pipeline, especially at bends and junctions where the dragging of the cable may actually cut into the inner surface of the pipeline.

An umbilical line is often used to power the electronic components of a self-propelled system and to bring out the resultant data. Since the umbilical line is not being used as a towline, much less force is imposed on the umbilical line, resulting in less potential damage to the pipeline.

Nevertheless, whether it utilizes a manually drawn towline or an umbilical line for power, the range of action of the inspection system is limited because of the friction resistance of the cable to be dragged along on the walls of the pipe. This friction resistance increases with increasing distance from the starting point, after negotiating several pipe elbows, and/or if the inspection system must negotiate steep inclines or vertical pipe sections.

Sufficient traction, i.e., the friction between the inspection system and the pipe wall, may overcome some of the problems associated with friction resistance of the dragging cable, and may facilitate negotiation of inclines and/or vertical pipe sections. Self-propelled inspection systems have typically been propelled with wheels that are rollingly held against the pipe wall. Unfortunately, the traction of the wheels in any sludge, which may have accumulated at the bottom of the pipe, is sometimes insufficient, thus causing the wheels to slip. The traction of the wheels has also typically been insufficient in prior art devices when the inspection system is propelled up an incline and/or up a vertical pipe section.

One prior art pipe crawler attempts to mitigate the problem of insufficient traction through the implementation of continuous treads spaced apart peripherally in lieu of wheels. Drive motors transmit motive force through transmission gearing to drive wheels for the continuous treads. The vehicle travels through the pipe along an inner wall surface as the continuous treads are driven by the drive wheels. Diametrically opposing pairs of continuous treads are mounted in opposing relationship for outward movement in opposite directions, and tread biasing means is disposed between the pair of continuous treads so as to effect the outward movement. Tread biasing means generally includes a spring system external to each of the continuous treads so as to interconnect a pair of continuous treads.

While such continuous treads may impart larger traction forces toward the pipe walls then wheeled units, this prior art pipe crawler has several problems. For example, retraction or extension of the spring system causes the linked pair of continuous treads to move inwardly or outwardly relative to one another. As such, the size of the passage between the pair of continuous treads is subject to change, potentially causing damage to cabling passing through the central passage. In addition, since the same spring force is imposed on both continuous treads of the linked treads, the system is not self-centering within a pipe which could be problematic for attached inspection devices and when negotiating bends or curves in the pipe. Furthermore, the diametrically opposed pairs of continuous treads cannot move independent from one another in order to accommodate variations in the pipe wall.

Additionally, orthogonally oriented pairs of continuous treads, i.e., those oriented at right angles from one another, of this prior art pipe crawler, are linked via the motor transmission gears. Accordingly, when the springs between the diametrically opposed pairs of continuous treads extend or retract in response to pipe diameter, the gears of the orthogonally oriented pairs of continuous treads may become misaligned and bind, potentially causing the vehicle to malfunction. In addition, this transmission gearing system prevents independent speed control of the continuous treads, thereby yielding restricted maneuverability.

Accordingly, what is needed is a self-propelled vehicle with traction sufficient to negotiate inclines, vertical pipe sections, and sludge laden pipe sections. What is further needed is a self-propelled vehicle that is self-centering, readily maneuvered, compact, and robust in design.

SUMMARY OF THE INVENTION

Accordingly, it is an advantage of the present invention that a self-propelled vehicle for movement in a tubular member is provided.

It is another advantage of the present invention that a self-propelled vehicle is provided that imparts sufficient traction force to negotiate steep inclines and vertical pipe sections.

Another advantage of the present invention is that a self-propelled vehicle is provided that imparts sufficient traction force to enable motive capability in opposition to friction forces caused by an umbilical cable and in the presence of slippery conditions.

Yet another advantage of the present invention is that a self-propelled vehicle is provided that is self-centering within a tubular member, readily maneuverable, compact, and robust in design.

The above and other advantages of the present invention are carried out in one form by a self-propelled vehicle for movement within a tubular member. The self-propelled vehicle includes a core element and propulsion mechanisms distributed about a perimeter of the core element. Each of the propulsion mechanisms includes a drive belt having an outer side and an inner side, a drive pulley encompassed by the drive belt for engaging the inner side of the drive belt, and means, encompassed by the drive belt, for providing outwardly-directed force to an underlying portion of the drive belt to press the outer side of the drive belt against an inner wall of the tubular member. A motor arrangement is in communication with each of the propulsion mechanisms for actuating the drive pulley to rotate the drive belt in contact with the inner wall of the tubular member thereby moving the vehicle.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

DETAILED DESCRIPTION OF THE PREFERRED EMBODIMENTS

Figure 1:
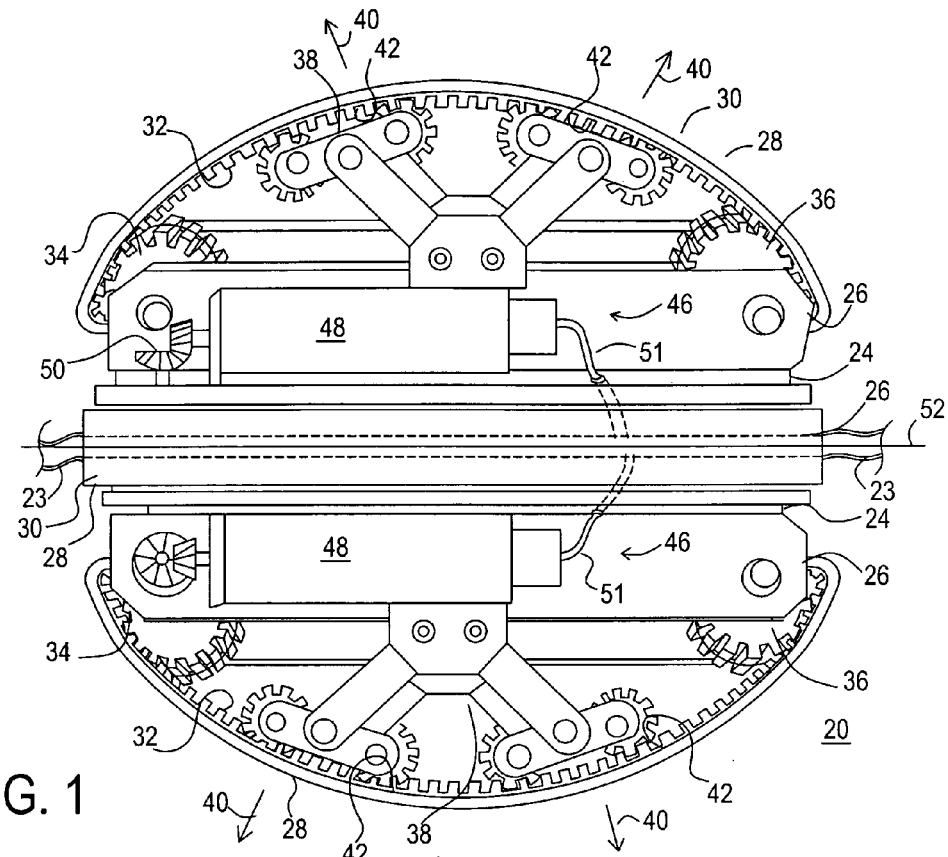
FIG. 1 shows a side view of a self-propelled vehicle in accordance with a preferred embodiment of the present invention.
Figure 2:
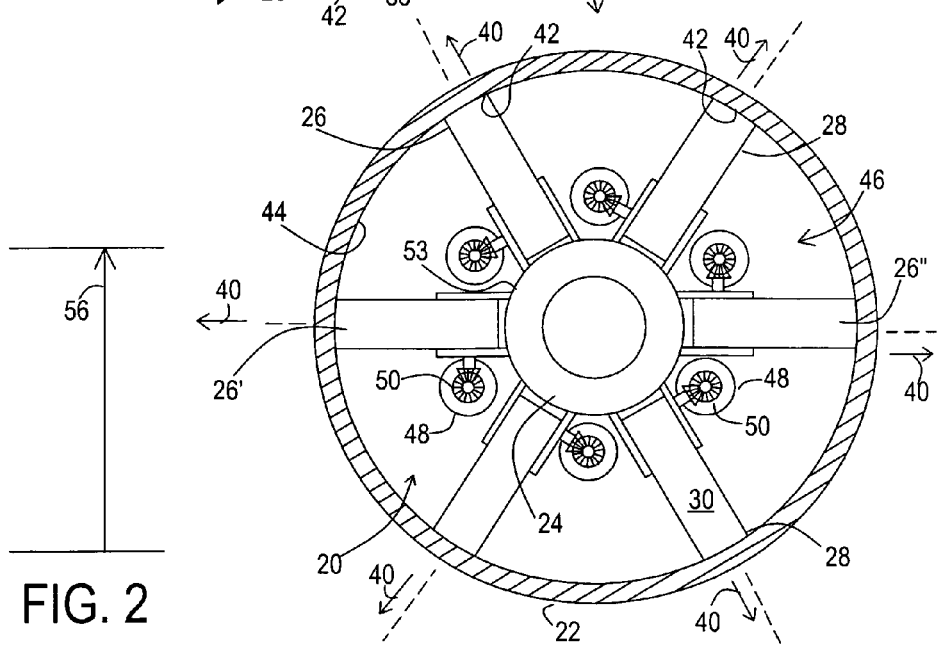
FIG. 2 shows a schematic end view of the self-propelled vehicle within a tubular member.

Referring to FIGS. 1–2, FIG. 1 shows a side view of a self-propelled vehicle 20 in accordance with a preferred embodiment of the present invention, and FIG. 2 shows a schematic end view of self-propelled vehicle 20 within a tubular member 22, such as a pipeline. One or more vehicles 20 may be utilized as part of a pipe inspection system for towing inspection devices, such as transmission and detection units, cameras, sensors, test probes, and the like, through a pipeline system to be inspected. As such, an umbilical line 23 (discussed below) may extend from one or both ends of vehicle 20 for carrying power and/or data.

Self-propelled vehicle 20 includes a core element 24 and propulsion mechanisms 26 distributed about a perimeter of core element 24. Each of propulsion mechanisms 26 includes a drive belt 28 having an outer side 30 and an inner side 32. A first pulley 34 and a second pulley 36 are encompassed, i.e., surrounded, by drive belt 28. More specifically, each of drive and driven pulleys 34 and 36, respectively, engage inner side 32 of drive belt 28, and drive belt 28 extends longitudinally between drive and driven pulleys 34 and 36. First pulley 34 will be referred to as a drive pulley 34 and second pulley 36 will be referred to as a driven pulley 36 in connection with the description of FIGS. 1–13.

A mid-roller assembly 38 is interposed between drive pulley 34 and driven pulley 36. As such, mid-roller assembly 38 is also encompassed by drive belt 28. Mid-roller assembly 38 provides outwardly-directed force, represented by arrows 40, to an underlying portion 42 of drive belt 28 to press outer side 30 of drive belt 28 against an inner wall 44 of tubular member 22. Mid-roller assembly 38 will be discussed in greater detail below.

A motor arrangement 46 is in communication with each of propulsion mechanisms 26. Motor arrangement 46 includes, for each of propulsion mechanisms 26, a motor 48 and transmission gearing 50 coupled between motor 48 and drive pulley 34. Each motor 48 functions to actuate its respective drive pulley 34 to rotate drive belt 28 in contact with inner wall 44 of tubular member 22 thereby moving vehicle 20. Motors 48 are desirably DC motors that utilize D.C. power received as vehicle control signals via a wiring pigtail 51 branching from umbilical line 23.

In a preferred embodiment, the speed of each motor 48 is individually controllable by the vehicle control signals received via wiring pigtail. Thus, since each propulsion mechanism 26 is driven by its own motor 48 and transmission gearing 50, the speed and direction of travel of self-propelled vehicle 20 may be readily controlled by a remote operator.

In a preferred embodiment, vehicle 20 includes six propulsion mechanisms 26 uniformly distributed about a perimeter 53 of core element 24. Accordingly, propulsion mechanisms 26 are positioned at approximately sixty degree intervals about core element 24. A longitudinal axis 52 of core element 24 is configured for alignment with the longitudinal axis of tubular member 22. When tubular member 22, and consequently, core element 24 are approximately horizontally oriented, an origin "O" may be characterized as a highest vertical site 56 on core element 24. In furtherance of a preferred embodiment, a first propulsion mechanism 26' of propulsion mechanisms 26 is offset about core element 24 approximately ninety degrees from origin "O". A second propulsion mechanism 26" diametrically opposes first propulsion mechanism 26' on core element 24. The particular orientation of first and second propulsion mechanisms 26' and 26" serves to maintain vehicle horizontally centered within tubular member 22.

It has been determined that this quantity of propulsion mechanisms 26, in combination with the particular orientation of propulsion mechanisms 26 described above, yields a vehicle with considerable traction, thereby minimizing slippage within tubular member 22 and overcoming the friction resistance of umbilical line 23. In addition, vehicle 20 having six propulsion mechanisms 26 each operational with its own corresponding motor 48, best fits about the periphery of core element 24. Those skilled in the art, however, will understand that in alternative embodiments, vehicle 20 may be adapted to include a different number of propulsion mechanisms depending upon traction requirements, space limitations within a pipeline, and the like.

Figure 3:
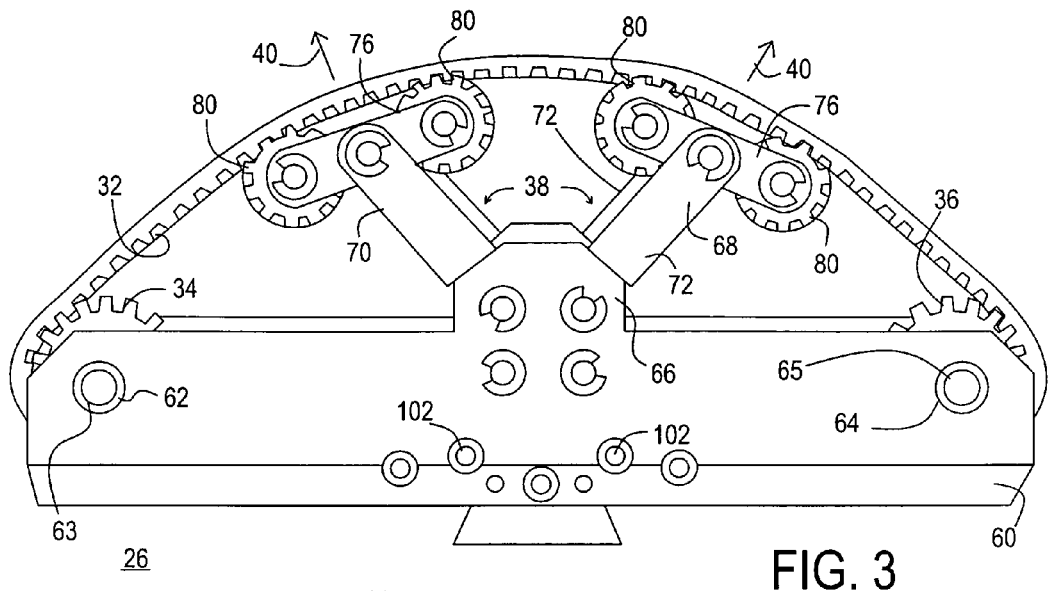
FIG. 3 shows a side view of a propulsion mechanism of the vehicle of FIG. 1.
Figure 4:
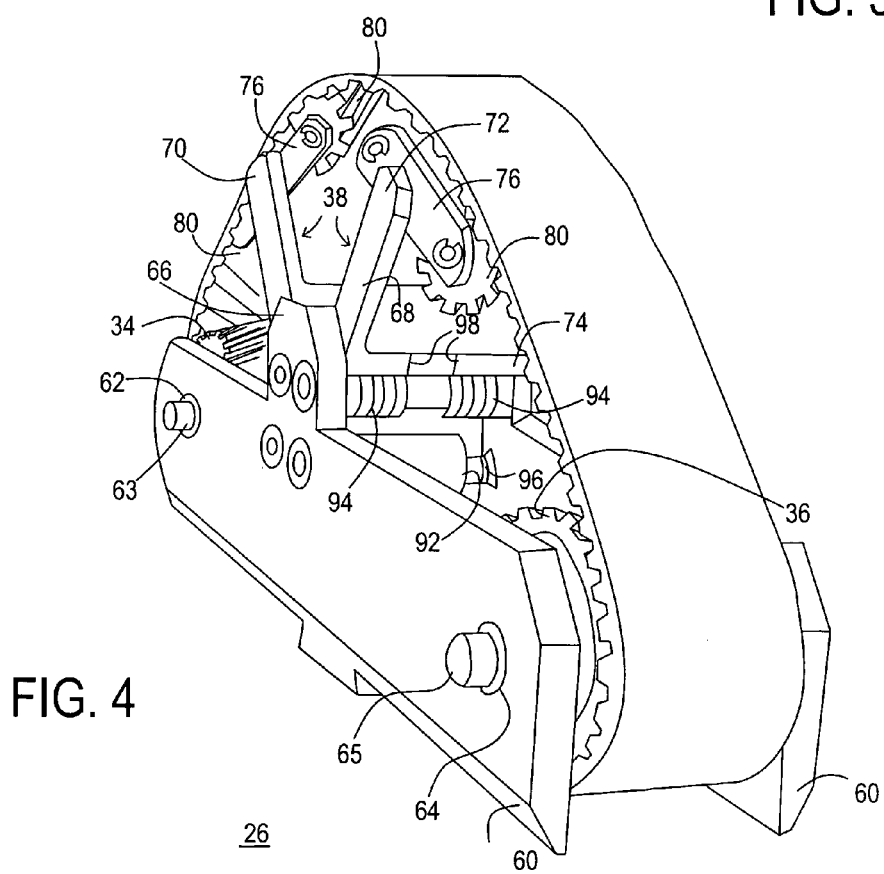
FIG. 4 shows a front perspective view of the propulsion mechanism.

Referring to FIGS. 3–4, FIG. 3 shows a side view of one of propulsion mechanisms 26 of vehicle 20 (FIG. 1), and FIG. 4 shows a front perspective view of propulsion mechanism 26. The following discussion applies equally to each of propulsion mechanisms 26 that make up self-propelled vehicle 20.

Propulsion mechanism 26 includes a frame 60 attachable to core element 24 (FIG. 2). Frame 60 includes a first mount 62 for pivotal attachment of an axle 63 of drive pulley 34, and a second mount 64 for pivotal attachment of an axle 65 of driven pulley 36. A support 66 extends from frame 60 for attachment of mid-roller assembly 38. Mid-roller assembly 38 includes a first roller unit 68 and a second roller unit 70.

Figure 5:
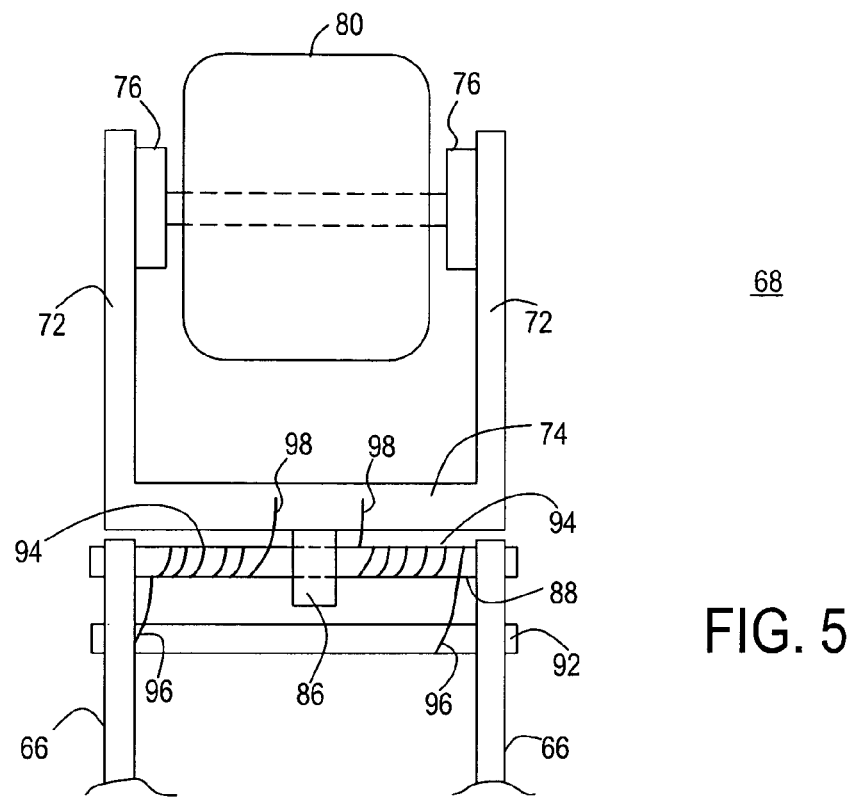
FIG. 5 shows a schematic front view of a first roller unit of a mid-roller assembly of the propulsion mechanism of FIG. 3.
Figure 6:
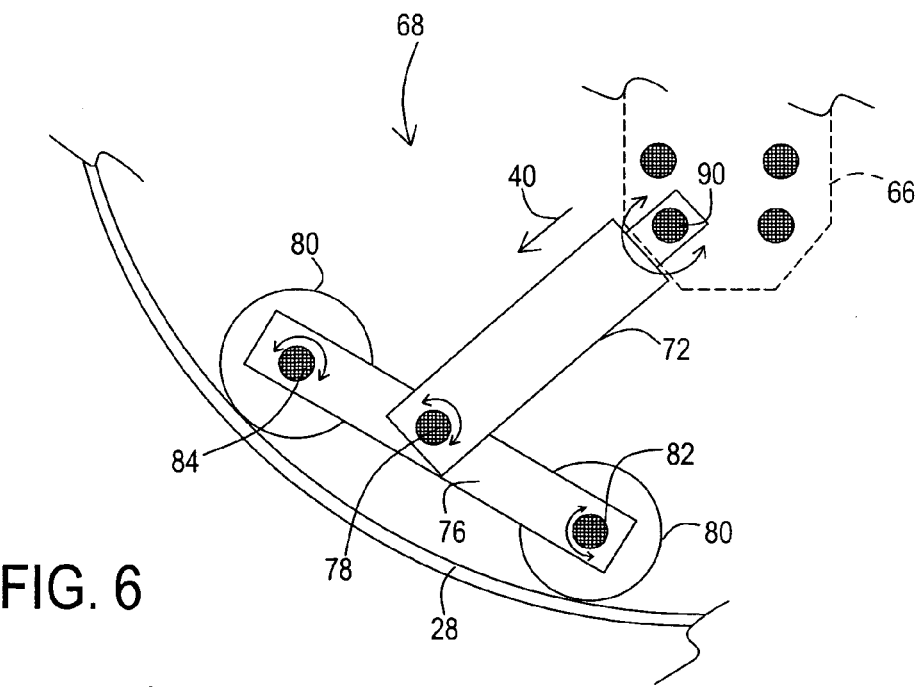
FIG. 6 shows a schematic side view of the first roller unit of FIG. 5.

Referring to FIGS. 5–6 in connection with FIGS. 3–4, FIG. 5 shows a schematic front view of first roller unit 68 of mid-roller assembly 38 of propulsion mechanism 26. FIG. 6 shows a schematic side view of the first roller unit 68. First and second roller units 68 and 70 function similarly. Accordingly, the following discussion directed toward first roller unit 68 applies equally to second roller unit 70.

First roller unit 68 includes a pair of uprights 72 supported by a crossbar 74. In turn, uprights 72 pivotally support a pair of rods 76 extending approximately transverse to uprights 72. This pivotal support is represented in FIG. 6 as a first pivot point 78. Rollers 80 are disposed between rods 76, and one each of rollers 80 is positioned at each end of rods 76.

Rollers 80 are pivotally coupled to rods 76. This coupling is represented in FIG. 6 as a second pivot point 82 and a third pivot point 84. In addition, rollers 80 engage with drive belt 28.

A post member 86 extends from crossbar 74 in a direction opposite from uprights 72. Post member 86 is firmly attached to an axle 88, which is in turn pivotally supported by support 66 of frame 60, and is represented in FIG. 6 by a fourth pivot point 90.

A non-rotating crossbar 92 is further coupled to each side of support 66 of frame 60. As shown, first roller unit 68 includes a torsion spring 94 wound about axle 88. Torsion spring 94 has a first end 96 anchored to non-rotating crossbar 92 and a second end 98 imparting spring force against crossbar 74. Torsion spring 94 spring loads first roller unit 68 relative to frame 60.

Accordingly, when drive pulley 34 is actuated via motor 48 (FIG. 1) to rotate drive belt 28, rollers 80 are enabled to roll in engagement with inner side 32 of drive belt 28 by pivoting action about second and third pivot points 82 and 84, respectively.

In addition, axle 88 is allowed to pivot relative to support 66, thereby enabling first roller unit 68 to pivot about fourth pivot point 90 relative to frame 60, and rods 76 are allowed to pivot relative to uprights 72 about first pivot point 78. Pivotal movement at first and fourth pivot points 78 and 90, respectively, allow first roller unit 68 to extend and retract in response to changes in diameter of tubular member 22 (FIG. 2), changes in direction of travel of vehicle 20 (FIG. 1), to negotiate obstacles, and so forth. As an adjunct to this pivotal movement, torsion spring 94 applies the appropriate spring force to produce outwardly-direct force 40 and maintain drive belt 28 in contact with inner wall 44 (FIG. 2) of tubular member 22 (FIG. 2) as first roller unit 68 is extended and retracted.

Spring force imparted against crossbar 74 need not be the same for each torsion spring 94 of each propulsion mechanism 26 (FIG. 3). When vehicle 20 is oriented substantially horizontal, some of propulsion mechanisms 26 (FIG. 1) are positioned substantially below core element 24 (FIG. 1) relative to those propulsion mechanisms 26 positioned substantially above core element 24. Accordingly, it may be desirable to adjust torsion springs 94 of propulsion mechanisms 26 (FIG. 1) positioned substantially below core element 24 to exhibit greater spring force against crossbar 74. This greater spring force offsets the weight of core element 24 combined with the weight of propulsion mechanisms 26 positioned substantially above core element 24 so that vehicle 20 is maintained approximately vertically centered within tubular member 22.

Figure 7:
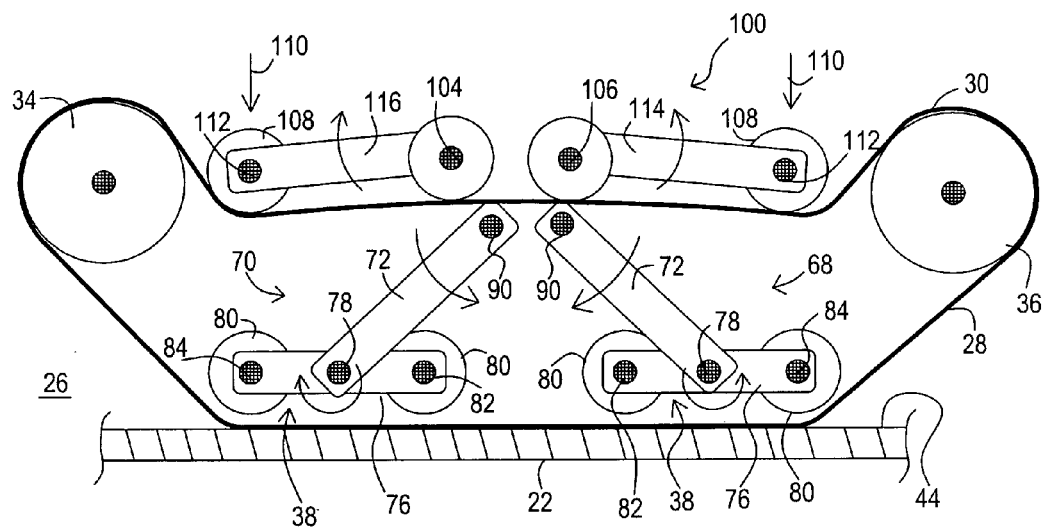
FIG. 7 shows a schematic side view of the propulsion mechanism with first and second roller units of the mid-roller assembly extended.
Figure 8:
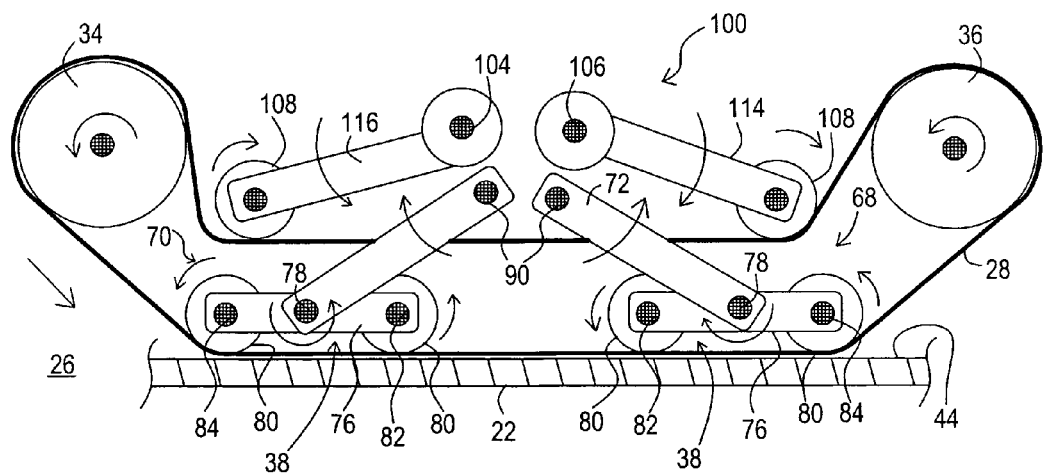
FIG. 8 shows a schematic side view of the propulsion mechanism with first and second roller units of the mid-roller assembly retracted.

Referring to FIGS. 7–8, FIG. 7 shows a schematic side view of propulsion mechanism 26 with first and second roller units 68 and 70, respectively, of mid-roller assembly 38 extended, and FIG. 8 shows a schematic side view of propulsion mechanism 26 with first and second roller units 68 and 70, respectively, of mid-roller assembly 38 retracted.

As shown schematically, propulsion mechanism 26 further includes a spring-loaded belt tension arrangement 100. Belt tension arrangement 100 is coupled to frame 60, via pivotal mounts 102 (FIG. 3) corresponding to first and second tension pivot points 104 and 106. In general, belt tension arrangement 100 functions to maintain a relatively constant belt tension of drive belt 28, when first and second roller units 68 and 70 are extended (FIG. 7) or retracted (FIG. 8). This is accomplished by enabling rod mounted rollers 108 to pivot about first and second tension pivot points 104 and 106 to apply a spring force 110 against outer side 30 of drive belt 28. Roller pivot points 112 additionally permit rollers 108 to roll against outer side 30 of drive belt 28 as drive belt 38 rotates.

As shown in FIG. 7, when first roller unit 68 extends, uprights 72 of first roller unit 68 pivot clockwise about fourth pivot point 90, and a first belt tension element 114 of belt tension arrangement 100 pivots counterclockwise about second tension pivot point 106. Correspondingly, when second roller unit 70 extends, uprights 72 of second roller unit 70 pivot counterclockwise about fourth pivot point 90, and a second belt tension element 116 of belt tension arrangement 100 pivots clockwise about first tension pivot point 104. Rods 76 correspondingly pivot, as shown, about first pivot point 78 so that rods 76 remain approximately parallel to inner wall 44 of tubular member 22, and rollers 80 are maintained in optimal engagement with drive belt 28.

The reverse is shown in FIG. 8. That is, when first roller unit 68 retracts, uprights 72 of first roller unit 68 pivot counterclockwise about fourth pivot point 90, and first belt tension element 114 of belt tension arrangement 100 pivots clockwise about second tension pivot point 106. Similarly, when second roller unit 70 retracts, uprights 72 of second roller unit 70 pivot clockwise about fourth pivot point 90, and a second belt tension element 116 of belt tension arrangement 100 pivots counterclockwise about first tension pivot point 104. Rods 76 again pivot, as shown, about first pivot point 78 so that rods 76 remain approximately parallel to inner wall 44 of tubular member 22, and rollers 80 are maintained in optimal engagement with drive belt 28.

It is further illustrated in FIG. 8, that as drive pulley 34 is actuated, drive belt 28 will move in the same direction as drive pulley 34. Similarly, rollers 80 and driven pulley 36 will also rotate in the same direction. However, since rollers 108 are located outside of drive belt 28, they will move the opposite direction from drive pulley 34, rollers 80 and driven pulley 36.

Figure 9:
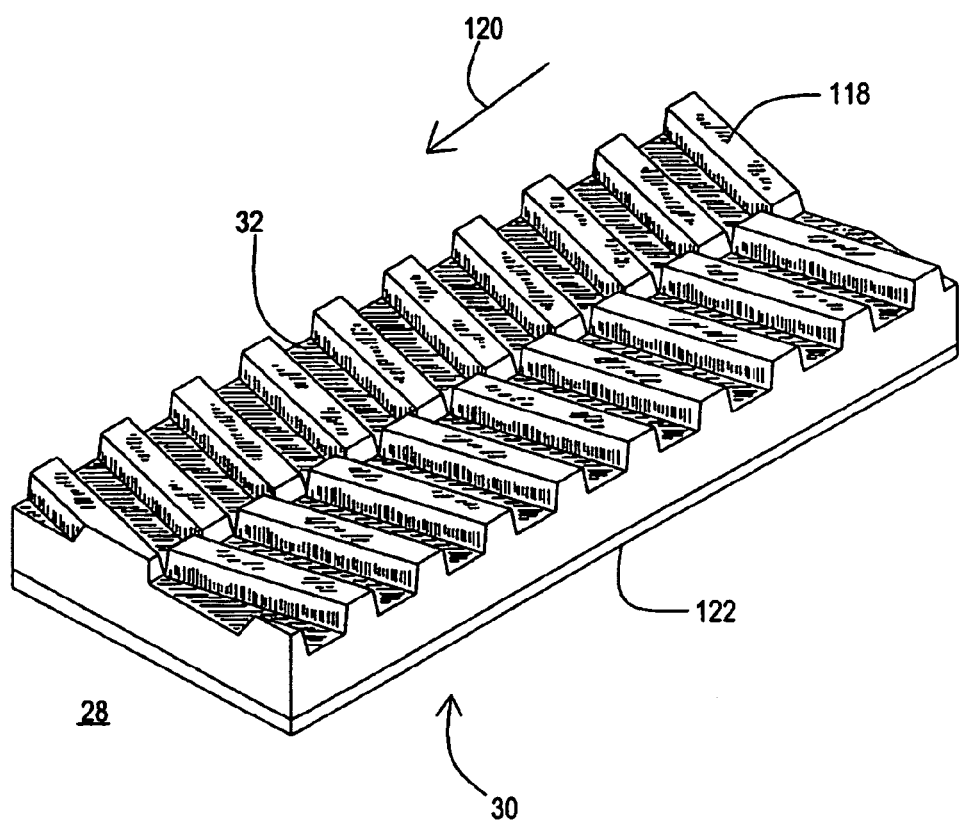
FIG. 9 shows a perspective view of a portion of a drive belt of the propulsion mechanism.

FIG. 9 shows a perspective view of a portion of drive belt 28 of propulsion mechanism 26 (FIG. 1). In a preferred embodiment, drive belt 28 is a synchronous drive belt, also known as a positive-drive belt, timing belt, or a high-torque belt. Generally, a synchronous drive belt has equally-spaced teeth, and runs on a toothed pulley that corresponds with the tooth profile of the belt such that the belt meshes into the pulley. A synchronous drive belt is preferred because it is not subject to slippage as compared to a conventional friction drive belt.

In addition, the drive belt is a self-tracking drive belt. Typically, a self-tracking drive belt has a tooth profile that results in the drive belt automatically tracking to one position on the correspondingly grooved pulley. Accordingly, the correspondingly grooved pulley does not require flanges to restrain the axial movement of the drive belt.

As shown, inner side 32 of drive belt 28 includes a series of self-tracking teeth 118. Teeth 118 may be formed in a v-pattern or an angled offset pattern. Preferably, inner side 32 is provided with at least two transversely adjacent rows of teeth 118 which are at oppositely balanced oblique angles to the longitudinal direction 120 of drive belt 28. One exemplary configuration is the EAGLE Pd™ Belt, manufactured by The Goodyear Tire & Rubber Company, Akron, Ohio.

FIG. 9 further shows an optional slip resistant coating 122 adhered to outer side 30 of drive belt 28. Slip resistant coating 122 functions to increase traction of outer side 30 of drive belt 28 against inner wall 44 (FIG. 2) of tubular member 22 (FIG. 2). Slip resistant coating 122 may be formed from rubber, neoprene, or other resilient materials.

Figure 10:
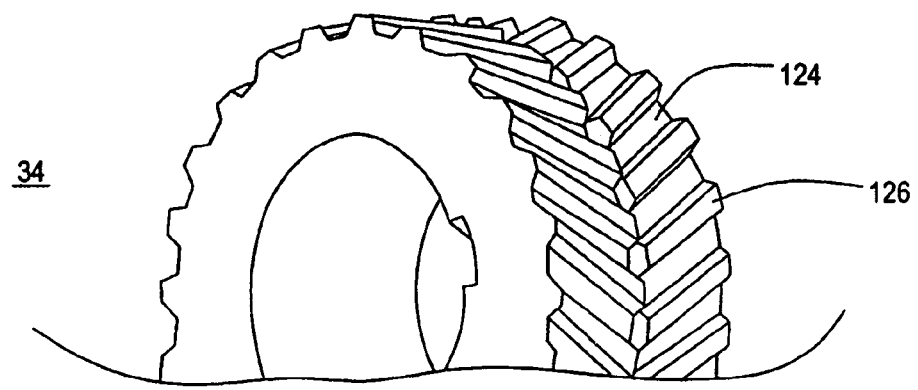
FIG. 10 shows a partial perspective view of a drive pulley of the propulsion mechanism.

FIG. 10 shows a partial perspective view of drive pulley 34 of propulsion mechanism 26. Drive pulley 34 has a belt engaging surface 124 that includes a series of complimentary teeth 126 that mesh with teeth 118 of drive belt 28. Drive pulley 34 is flangeless so that outer side 30 of drive belt 28 will more fully contact inner wall 44 (FIG. 2) of tubular member 22 (FIG. 2). In addition, a flangeless drive pulley 34 is employed to minimize the space requirements for propulsion mechanism 26 (FIG. 1), and to reduce angular edges that might damage or get snagged on inner wall 44 of tubular member 22. It should be understood that driven pulley 36 (FIG. 1) and rollers 80 (FIG. 3) may also be flangeless and include complimentary teeth 126 that mesh with teeth 118 of drive belt 28, as described in connection with drive pulley 34.

Figure 11:
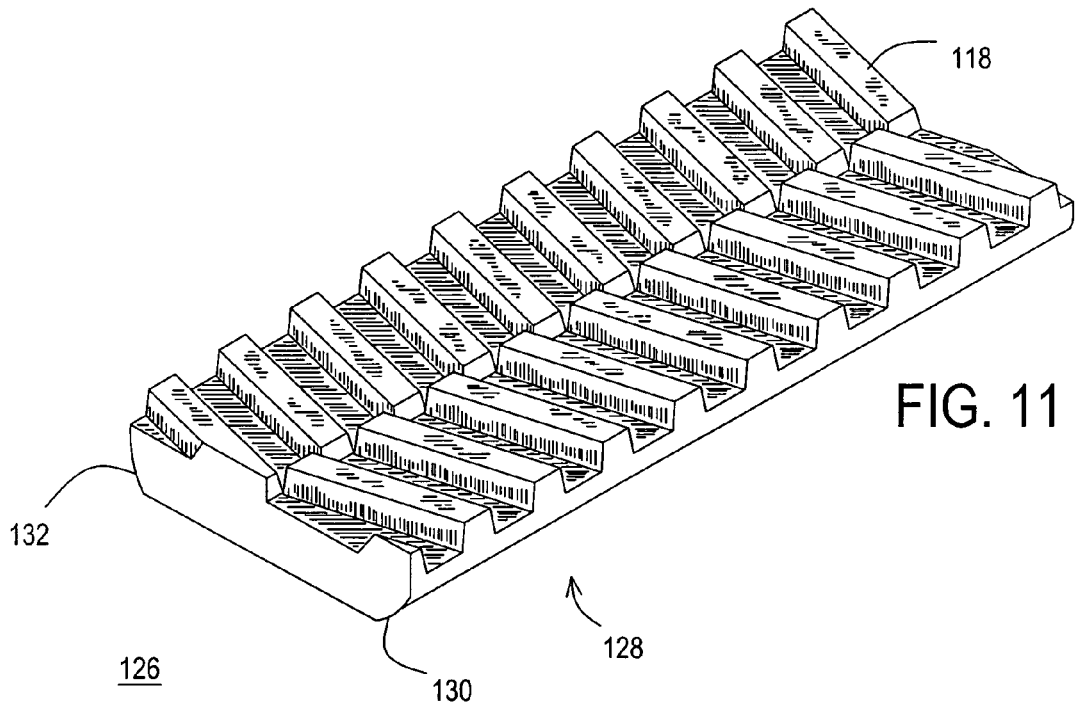
FIG. 11 shows a perspective view of a portion of a drive belt in accordance with an alternative embodiment of the present invention.

FIG. 11 shows a perspective view of a portion of a drive belt 126 in accordance with an alternative embodiment of the present invention. Like drive belt 34, drive belt 126 also includes self-tracking teeth 118 that mesh with complimentary teeth 126 (FIG. 10) of drive pulley 34. However, drive belt 126 further includes means for increasing traction of an outer side 128 of drive belt 126 against inner wall 44 (FIG. 2) of tubular member 22 (FIG. 2). In particular, outer side 128 of drive belt 126 has been formed to include a first arcuate edge 130 and a second arcuate edge 132.

First and second arcuate edges 130 and 132, respectively, are manufactured to be curved, rather than angular to more closely approximate the curvature of inner wall 44 (FIG. 2) of tubular member 22 (FIG. 2). By manufacturing outer side 128 of drive belt 126 to more closely approximate the curvature of inner wall 44, greater surface area contact between outer side 128 of drive belt and inner wall 44 is achieved. Greater surface area contact yields greater traction of self-propelled vehicle 20 (FIG. 1), and can increase the towing capability of vehicle 20 by as much as twenty percent.

Figure 12:
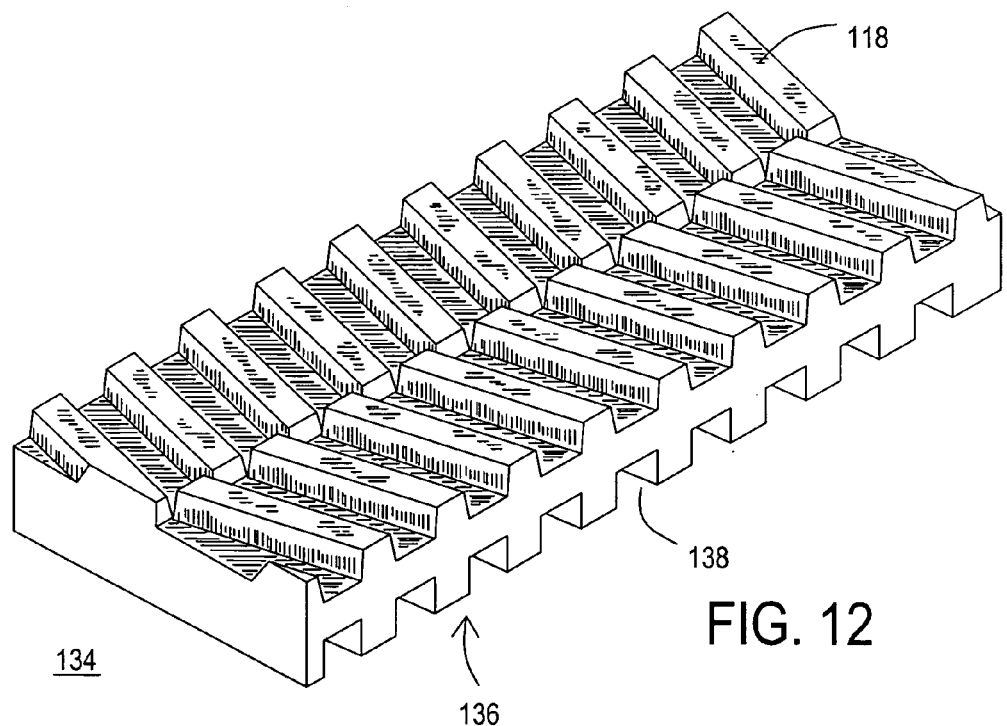
FIG. 12 shows a perspective view of a portion of a drive belt in accordance with another alternative embodiment of the present invention.

FIG. 12 shows a perspective view of a portion of a drive belt 134 in accordance with another alternative embodiment of the present invention. Like drive belts 34 (FIG. 9) and 126 (FIG. 11), drive belt 134 also includes self-tracking teeth 118 that mesh with complimentary teeth 126 (FIG. 10) of drive pulley 34 (FIG. 10). However, an outer side 136 is fabricated to include a plurality of grooves 138, thus establishing treads for increasing traction of outer side 136 of drive belt 134 against inner wall 44 (FIG. 2) of tubular member 22 (FIG. 2).

Each of drive belts 34 (FIG. 9), 126 (FIG. 11), and 134 (FIG. 12) individually include means for increasing traction of vehicle 20 (FIG. 1). However, it should be understood that alternative drive belts may be produced to include various combinations of the techniques, or none of the techniques for increasing traction, described in connection with FIGS. 9, 11, and 12.

Figure 13:
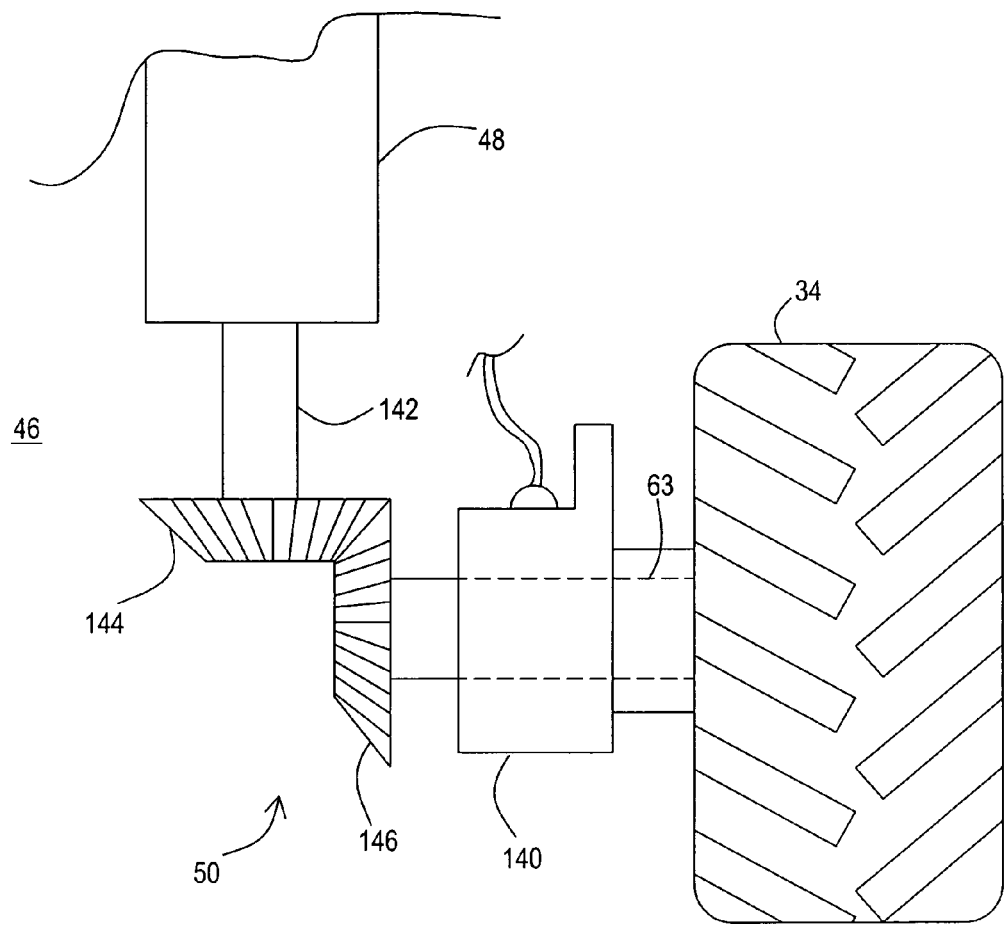
FIG. 13 shows a schematic top view of transmission gearing of a motor arrangement and a clutch system associated with the propulsion mechanism of FIG. 3.

FIG. 13 shows a schematic top view of transmission gearing 50 of motor arrangement 46 and a clutch system 140 associated with each of propulsion mechanisms 26 (FIG. 3) of self-propelled vehicle 20 (FIG. 1). An axle 142 extends from motor 48 and rotates in response to actuation of motor 48. A drive gear 144 is attached to an end of axle 142. A driven gear 146 is coupled to axle 63 fixed to drive pulley 34. Driven gear 146 meshes with drive gear 144 so that rotational speed of axle 142 is transferred to axle 63 to thus rotate drive pulley 34 in accordance with well known methodologies.

Should there be a loss of power to one or more motors 48 of vehicle 20, it may be difficult or impossible to rotate the effected drive pulleys 34. That is, loss of rotation of axle 142 may cause drive gear 144 and driven gear 146 to lock up.

This problem is exacerbated with a large gear ratio between drive gear 144 and driven gear 146. If drive pulley 34 is difficult to rotate or cannot be rotated, it may be highly problematic to pull self-propelled vehicle 20 (FIG. 1) from tubular member 22 (FIG. 2). Thus, vehicle 20 could become a "flaw" (i.e., a blockage) of the pipeline, necessitating costly repair.

Consequently, motor arrangement 46 includes clutch system 140 interposed between transmission gearing 50 and drive pulley 34. During a malfunction or loss of power to motor 48, clutch system 140 functions to disconnect axle 63 from transmission gearing 50 so that drive pulley 34 is disengaged from motor 48. Thus, should a power loss occur, vehicle 20 can more readily be manually pulled from tubular member 22 (FIG. 2).

In an exemplary embodiment, clutch system 142 may be an electromagnetic spring clutch, although other clutch mechanisms may alternatively be employed. In addition, those skilled in the art will recognize that there are various ways in which a clutch mechanism may be employed for selectively disengaging motor 48 and its corresponding propulsion mechanism 26 (FIG. 3).

Figure 14:
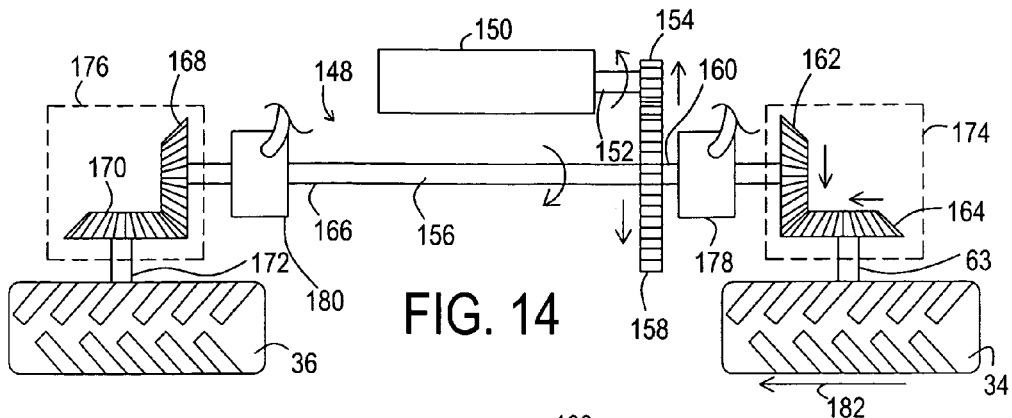
FIG. 14 shows a schematic top view of a motor arrangement in accordance with an alternative embodiment of the present invention.
Figure 15:
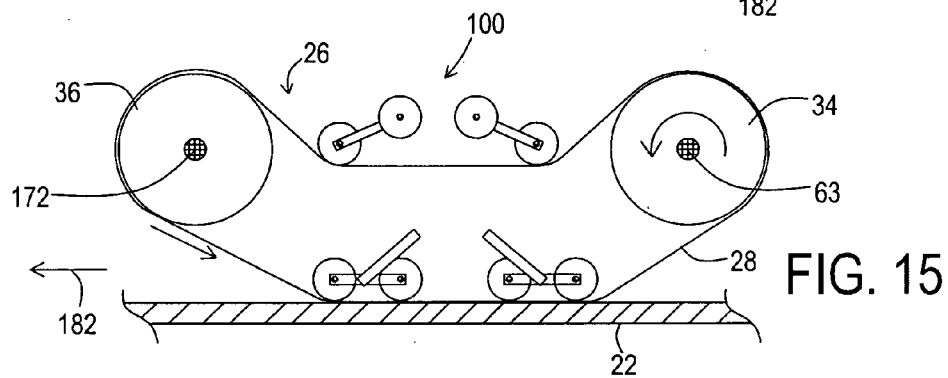
FIG. 15 shows a schematic side view of the propulsion mechanism being propelled in a first direction in response to actuation of the motor arrangement of FIG. 14.

Referring to FIGS. 14 and 15, FIG. 14 shows a schematic top view of a motor arrangement 148 in accordance with an alternative embodiment of the present invention. FIG. 15 shows a schematic side view of propulsion mechanism 26 being propelled in a first direction 182 in response to actuation of motor arrangement 148. Motor arrangement 148 allows propulsion mechanisms 26 of self-propelled vehicle 20 (FIG. 1) to more readily switch between forward and reverse directions of travel within tubular member 22 (FIG. 1).

Through the implementation of motor arrangement 148, either drive pulley 34 or driven pulley 36 of propulsion mechanism may be actuated by motor arrangement 148. Accordingly, drive and driven pulleys 34 and 36 are referred to in the following discussion by their generic nomenclature, as first pulley 34 and second pulley 36.

Motor arrangement 148 includes a motor 150 with a rotatable axle 152, and a first gear 154 coupled to axle 152. A drive shaft 156 includes a second gear 158 that meshes with first gear 154. Drive shaft 156 has a first end 160 in communication with a first drive gear 162. A first driven gear 164 is coupled to axle 63 fixed to first pulley 34. Drive shaft 156 has a second end 166 in communication with a second drive gear 168. A second driven gear 170 is coupled to an axle 172 fixed to second pulley 36. First drive gear 162 and first driven gear 164 may be housed in a gear box 174, represented by dashed lines. Similarly, second drive gear 168 and second driven gear 170 may also be housed in a gear box 176, represented by dashed lines.

A first clutch 178 is interposed between first end 160 of drive shaft 156 and first pulley 34 for selective disengagement of first pulley 34 from drive shaft 156. Similarly, a second clutch 180 is interposed between second end 166 of drive shaft 156 and second pulley 36 for selective disengagement of second pulley 36 from drive shaft 156. First and second clutches 178 and 180, respectively, function to selectively disconnect either axle 63 or axle 172 from drive shaft 156 so that the corresponding one of first and second pulleys 34 and 36 is disengaged from motor 150, while the other of first and second pulleys 34 and 36 remains engaged with motor 150.

In operation, as illustrated in FIGS. 14–15, second clutch 180 is disengaged so that second pulley 36 is disengaged from motor 150. Consequently, in this first scenario, first pulley 34 is the drive pulley. When motor 150 is actuated, axle 152 rotates in a first direction. Due to the meshing of first and second gears 154 and 158, respectively, drive shaft 156 rotates in a direction opposite from axle 152. However, through their communication via drive shaft 156, rotation of second gear 158 results in the rotation of first drive gear 162 in the same direction as second gear 158. First driven gear 164 meshes with first drive gear 162 so that rotational speed of drive shaft 156 is transferred to axle 63 to thus rotate first pulley 34. As shown in FIG. 15, first pulley 34 rotates to "push" propulsion mechanism in first direction 182 through tubular member 22.

Figure 16:
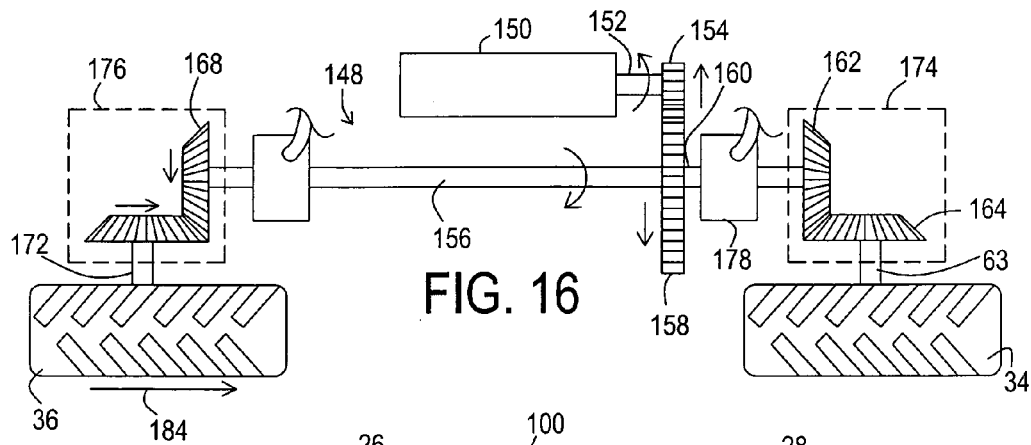
FIG. 16 shows a schematic top view of the motor arrangement of FIG. 14 actuated to cause movement of the propulsion mechanism in a second direction.
Figure 17:
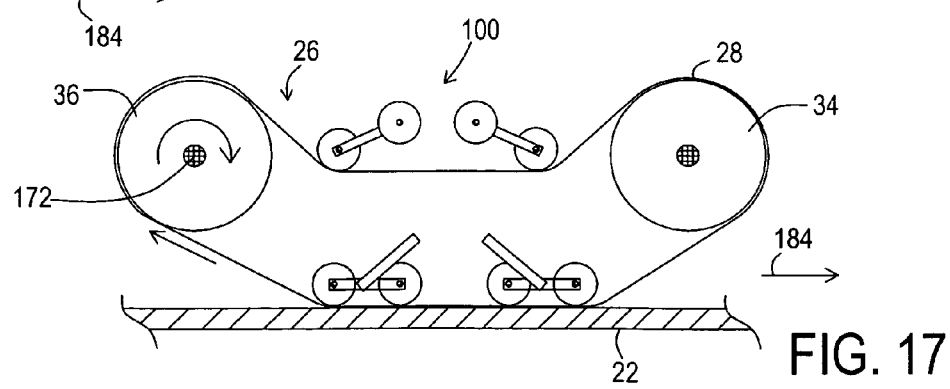
FIG. 17 shows a schematic side view of the propulsion mechanism being propelled in the second direction in response to actuation of the motor arrangement of FIG. 14.

Referring now to FIGS. 16–17, FIG. 16 shows a schematic top view of motor arrangement 148 actuated to cause movement of the propulsion mechanism in a second direction 184, and FIG. 17 shows a schematic side view of propulsion mechanism 26 being propelled in a second direction 184 in response to actuation of the motor arrangement 148.

In operation, as illustrated in FIGS. 16–17, first clutch 178 is disengaged so that first pulley 34 is disengaged from motor 150. Consequently, in this second scenario, second pulley 36 is the drive pulley. As discussed in connection with FIGS. 14–15, when motor 150 is actuated, axle 152 rotates, and due to the meshing of first and second gears 154 and 158, respectively, drive shaft 156 rotates in a direction opposite from axle 152. Now however, through their communication via drive shaft 156, rotation of second gear 158 results in the rotation of second drive gear 166 in the same direction as second gear 158. Second driven gear 170 meshes with second drive gear 168 so that rotational speed of drive shaft 156 is transferred to axle 172 to thus rotate second pulley 36. As shown in FIG. 17, second pulley 36 rotates to "push" propulsion mechanism 26 in second direction 184, opposite from first direction 182, through tubular member 22.

Thus, direction of movement of propulsion mechanism 26 is determined by which of first and second pulleys 34 and 36, respectively is the current drive pulley in communication with motor 150. By having the drive pulley "push" propulsion mechanism 26 through tubular member 22, any slack in drive belt 28 is forced toward belt tension arrangement 100, so that arrangement 100 can accommodate the slack and thereby mitigate any potential problems with drive belt 28 coming off of first and second pulleys 34 and 36. This feature is especially advantageous if propulsion mechanism 26 is subjected to any side loads such as when vehicle 20 (FIG. 1) is turning a corner or when vehicle 20 is being centered in tubular member 22.

Similar to motor arrangement 46, discussed in connection with FIG. 13, during a malfunction or loss of power to motor 150, both first and second clutches 178 and 180 may be disconnected so as to disconnect both axle 63 and axle 172 from drive shaft 156 so that both first and second pulleys 34 and 36 are disengaged from motor 150. Thus, should a power loss occur, vehicle 20 configured with motor arrangement 148 can more readily be manually pulled from tubular member 22 (FIG. 2).

Figure 18:
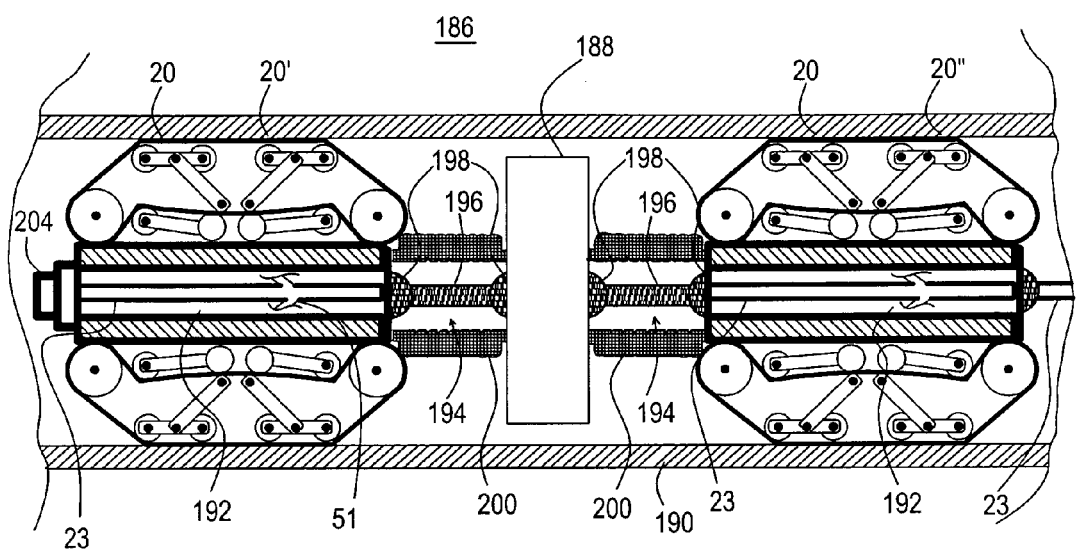
FIG. 18 shows a schematic view of a pipe inspection system that includes a number of self-propelled vehicles and an inspection device moving within a tubular member, such as a pipeline.
Figure 19:
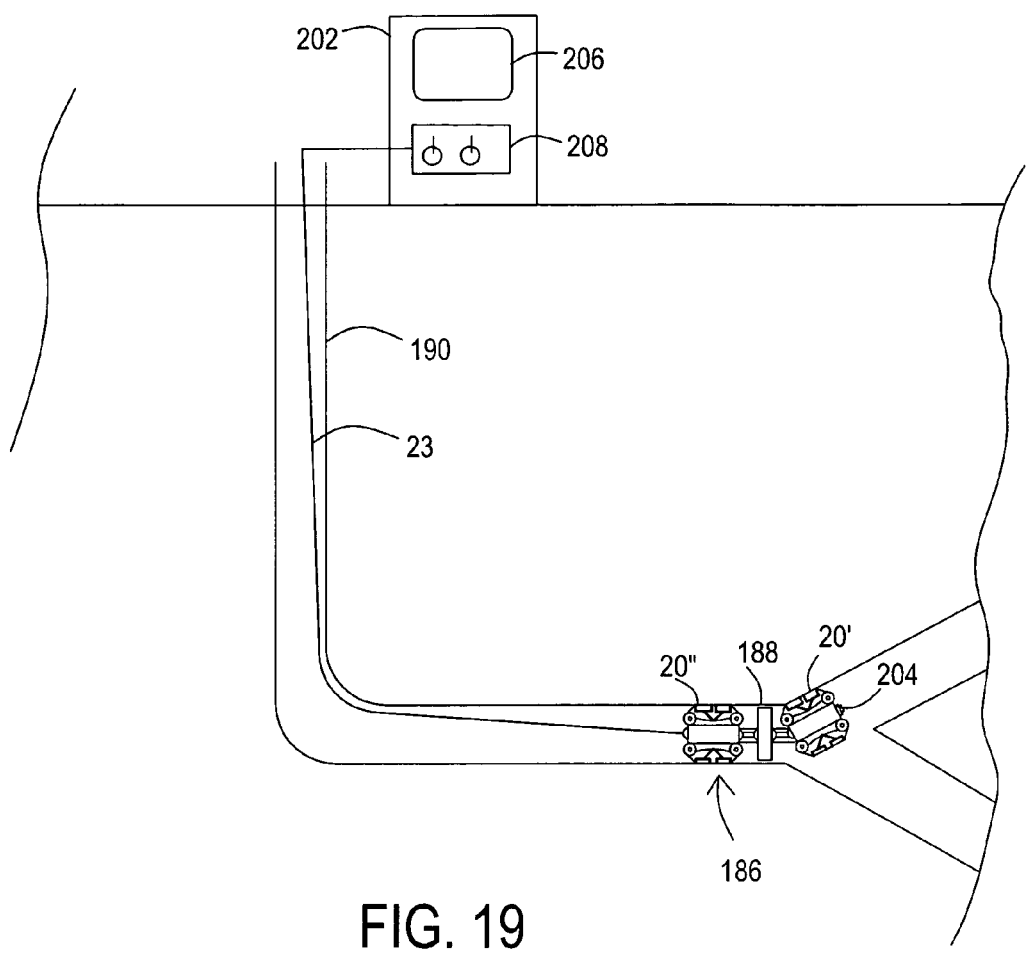
FIG. 19 shows a schematic view of the pipeline through which the pipe inspection system of FIG. 14 navigates.

Referring to FIGS. 18–19, FIG. 18 shows a schematic view of a pipe inspection system 186 that includes a number of self-propelled vehicles 20 and an inspection device 188 moving within a tubular member, such as a pipeline 190. FIG. 19 shows a schematic view of pipeline 190 through which inspection system 186 navigates. Self-propelled vehicles 20 are illustrated with only two propulsion mechanisms 26 for simplicity of illustration. However, it should be understood that vehicles 20 of pipe inspection system 186 desirably include a number of propulsion mechanisms 26, configured as described in connection with FIG. 2.

Pipeline 190 may include a non-uniform internal diameter, vertical sections, steep inclines, bends, "T's", and elbows that complicate navigation and inspection thereof. Self-propelled vehicles 20 can advantageously move within such convoluted pipelines. In the exemplary scenario of FIG. 19, pipeline 190 is located underground where manual inspection cannot practically be performed. However, the present invention need not be limited to navigation of underground pipelines, but may additionally be utilized to navigate through underwater pipelines and/or above ground pipelines within larger systems.

Pipe inspection system 186 is shown with only two self-propelled vehicles 20 and a single inspection device 188 for simplicity of illustration. However, alternative inspection configurations may include only one vehicle 20, and still other inspection configurations may include more than two vehicles 20 and/or more than one inspection device 188.

In this exemplary configuration, a leading vehicle, i.e. a first self-propelled vehicle 20', inspection device 188, and a trailing vehicle, i.e. a second self-propelled vehicle 20" are linked to one another via umbilical line 23 to form pipe inspection system 186. Core element 24 of each of first and second vehicles 20' and 20" includes a duct 192 (represented schematically) for passage of umbilical line 23 and distribution of power and signals conveyed by umbilical line 23 to wiring pigtails 51.

Flexible connections 194 are utilized between first vehicle 20' and inspection device 188, and between inspection device 188 and second vehicle 20" through which umbilical line 23 is passed. By way of example, each flexible connection 194 may be constructed with a shaft 196 and a pair of ball joints 198 that form the coupling between respective vehicles 20 and inspection device 188. Shaft 196 and ball joints 198 desirably include a passage (not visible) through which umbilical line 23 passes. In addition, flexible connections 194 may be optionally enclosed by a moisture resistant, flexible barrier 200. The flexibility of connections 194 and barrier 200 enables first vehicle 20', inspection device 188, and second vehicle 20" to independently navigate through curves and to stay centralized within pipeline 190 even when moving through a short radius bend in pipeline 190.

Umbilical line 23 further links pipe inspection system 186 to a monitoring and control station 202 positioned above ground remote from pipe inspection system 186. Umbilical line 23 desirably includes an internal strengthening member and strain relief, and conveys power for dc motors 48 (FIG. 1) or motors 150 (FIG. 14), control signals to vehicles 20 and inspection device 188, data from inspection device 188 and an onboard camera 204, and feedback signals from vehicles 20 to monitoring and control station 202.

Monitoring and control station 202 may include a monitor 206 for viewing video received from onboard camera 204, and operator controls 208 for enabling an operator to control speed and direction of pipe inspection system 186. Operator controls 208 may be a joystick, through a keyboard, or other such known peripheral controls.

Umbilical line 23 may further convey feedback signals from pipe inspection system 186 to monitoring and control station 202. Feedback signals may simply be the video image returned from camera 204. In addition, or alternatively, the feedback signals may be a map of pipeline 190 overlaid with a present location and movement of pipe inspection system 186, similar to that shown in FIG. 19.

Other feedback signals may be a numerical readout presented on monitor 206 indicating a current movement condition, such as an operating speed, of each propulsion mechanism 26. By utilizing such controls and information, an operator can control movement of pipe inspection system 186 through pipeline 190 to perform non-destructive inspection of pipeline 190 and/or to clean pipeline 190.

In summary, the present invention teaches of a self-propelled vehicle for movement in a tubular member. The self-propelled vehicle includes propulsion mechanisms uniformly distributed about a perimeter of a core element of the vehicle. The propulsion mechanisms utilize pulley-driven, self-tracking drive belts that press firmly against the inner wall of the tubular member so as to effectively move within the tubular member. Mid-roller assemblies of the propulsion mechanisms impart significant traction force through spring loading to negotiate steep inclines, vertical pipe sections, and navigate under slippery conditions. In addition, the traction force overcomes the friction resistance of the umbilical line dragged along on the walls of the pipeline. The spring-force actuation, a self-tracking belt drive, flangeless pulleys, and the configuration of propulsion mechanisms about the core element yield a vehicle that is self-centering within a tubular member, is readily maneuverable, is compact, and is robust in design.

Although the preferred embodiments of the invention have been illustrated and described in detail, it will be readily apparent to those skilled in the art that various modifications may be made therein without departing from the spirit of the invention or from the scope of the appended claims. For example, a self-propelled vehicle such as that described above can be readily adapted to fit within a variety of tubular members having various interior diameters.

What is claimed is:

1. A self-propelled vehicle for movement within a tubular member comprising:
   a core element;
   propulsion mechanisms distributed about a perimeter of said core element, each of said propulsion mechanisms including:
      a drive belt having an outer side and an inner side;
      a drive pulley encompassed by said drive belt for engaging said inner side of said drive belt;
      a driven pulley encompassed by said drive belt for engaging said inner side of said drive belt, said drive belt extending longitudinally between said driven pulley and said drive pulley; and
      means, encompassed by said drive belt, for providing outwardly-directed force to an underlying portion of said drive belt to press said outer side of said drive belt against an inner wall of said tubular member, said providing means comprising a spring loaded mid-roller assembly interposed between said drive pulley and said driven pulley, wherein:
      a first one of said propulsion mechanisms is located at a first position substantially above said core element; and
      a second one of said propulsion mechanisms is located at a second position substantially below said core element, and said mid-roller assembly of said second propulsion mechanism exhibits greater spring force than said mid-roller assembly of said first propulsion mechanism; and
   a motor arrangement in communication with said each of said propulsion mechanisms for actuating said drive pulley to rotate said drive belt in contact with said inner wall of said tubular member thereby moving said vehicle.

2. A vehicle as claimed in claim 1 wherein:
said first one of said propulsion mechanisms is offset about said core element approximately ninety degrees from an origin, said origin corresponding to a highest vertical site on said core element when said core element is horizontally oriented; and
said second one of said propulsion mechanisms diametrically opposes said first propulsion mechanism on said core element.

3. A vehicle as claimed in claim 1 wherein said vehicle includes six of said propulsion mechanisms uniformly distributed about said core element.

4. A vehicle as claimed in claim 1 wherein said drive belt is a synchronous drive belt.

5. A vehicle as claimed in claim 1 wherein said drive belt is a self-tracking drive belt.

6. A vehicle as claimed in claim 1 wherein said drive pulley is flangeless.

7. A vehicle as claimed in claim 1 wherein:
said vehicle further comprises a controller positioned remote from said vehicle, and a control cable interposed between said motor arrangement and said controller for conveying vehicle control signals from said controller to said motor arrangement; and
said core element comprises a duct for passage of said control cable.

8. A vehicle as claimed in claim 7 wherein said control cable conveys feedback signals from said vehicle to said controller, said feedback signals indicating a movement condition of said each of said propulsion mechanisms.

9. A vehicle as claimed in claim 1 wherein said drive belt further comprises means for increasing traction of said outer side of said drive belt against said inner wall of said tubular member.

10. A vehicle as claimed in claim 9 wherein said drive belt comprises a first arcuate edge and a second arcuate edge configured to contact said inner wall of said tubular member to establish said traction increasing means.

11. A vehicle as claimed in claim 9 wherein said outer side of said drive belt comprises a plurality of grooves to establish said traction increasing means.

12. A vehicle as claimed in claim 9 wherein said traction increasing means comprises a slip resistant coating adhered to said outer side of said drive belt.

13. A self-propelled vehicle for movement within a tubular member comprising:
a core element;
propulsion mechanisms distributed about a perimeter of said core element, each of said propulsion mechanisms including:
a drive belt having an outer side and an inner side;
a drive pulley encompassed by said drive belt for engaging said inner side of said drive belt; and
means, encompassed by said drive belt, for providing outwardly-directed force to an underlying portion of said drive belt to press said outer side of said drive belt against an inner wall of said tubular member; and
a motor arrangement in communication with said each of said propulsion mechanisms for actuating said drive pulley to rotate said drive belt in contact with said inner wall of said tubular member thereby moving said vehicle, said motor arrangement comprising a plurality of motors and a plurality of transmission gearing such that said each of said propulsion mechanisms has associated therewith a distinct one of said motors and a distinct one of said transmission gearing coupled between said distinct motor and said drive pulley, wherein a speed of each of said plurality of motors is individually controllable to effect a direction of travel of said vehicle.

14. A vehicle as claimed in claim 13 wherein:
said drive pulley is a first pulley;
said each of said propulsion mechanisms includes a second pulley encompassed by said drive belt for engaging said inner side of said drive belt, said drive belt extending longitudinally between said first and second pulleys;
said motor arrangement further comprises a drive shaft selectively engaged with said first and second pulleys, said drive shaft being in communication with said motor such that actuation of said motor rotates said drive shaft; and
said vehicle further comprises a first clutch interposed between said drive shaft and said first pulley for selective disengagement of said first pulley from said drive shaft, and a second clutch interposed between said drive shaft and said second pulley for selective disengagement of said second pulley from said drive shaft.

15. A self-propelled vehicle for movement within a tubular member comprising:
a core element;
propulsion mechanisms distributed about a perimeter of said core element, each of said propulsion mechanisms including:
a drive belt having an outer side and an inner side;
a drive pulley encompassed by said drive belt for engaging said inner side of said drive belt; and
means, encompassed by said drive belt, for providing outwardly-directed force to an underlying portion of said drive belt to press said outer side of said drive belt against an inner wall of said tubular member;
a motor arrangement in communication with said each of said propulsion mechanisms for actuating said drive pulley to rotate said drive belt in contact with said inner wall of said tubular member thereby moving said vehicle; and
a clutch system interposed between said propulsion mechanisms and said motor arrangement for selective disengagement of said motor arrangement and said propulsion mechanisms.

16. A self-propelled vehicle for movement within a tubular member comprising:
a core element;
propulsion mechanisms distributed about a perimeter of said core element, each of said propulsion mechanisms including:
a self-tracking drive belt having an outer side and an inner side;
a flangeless drive pulley encompassed by said drive belt for engaging said inner side of said drive belt; and
means, encompassed by said drive belt, for providing outwardly-directed force to an underlying portion of said drive belt to press said outer side of said drive belt against an inner wall of said tubular member; and
a motor arrangement in communication with said each of said propulsion mechanisms for actuating said drive pulley to rotate said drive belt in contact with said inner wall of said tubular member thereby moving said vehicle.

17. A vehicle as claimed in claim 16 wherein:
said each of said propulsion mechanisms further includes a flangeless driven pulley encompassed by said self-tracking drive belt for engaging said inner side of said drive belt, said drive belt extending longitudinally between said driven pulley and said drive pulley; and
said providing means comprises a mid-roller assembly interposed between said drive pulley and said driven pulley.

18. A vehicle as claimed in claim 17 wherein said mid-roller assembly is spring loaded.

19. A vehicle as claimed in claim 16 wherein said motor arrangement comprises, for said each of said propulsion mechanisms, a motor and transmission gearing coupled between said motor and said drive pulley, wherein a speed of said motor is individually controllable to effect a direction of travel of said vehicle.

20. A vehicle as claimed in claim 19 wherein:
said drive pulley is a first pulley;
said each of said propulsion mechanisms includes a second pulley encompassed by said drive belt for engaging said inner side of said drive belt, said drive belt extending longitudinally between said first and second pulleys;
said motor arrangement further comprises a drive shaft selectively engaged with said first and second pulleys, said drive shaft being in communication with said motor such that actuation of said motor rotates said drive shaft; and
said vehicle further comprises a first clutch interposed between said drive shaft and said first pulley for selective disengagement of said first pulley from said drive shaft, and a second clutch interposed between said drive shaft and said second pulley for selective disengagement of said second pulley from said drive shaft.

21. A vehicle as claimed in claim 16 wherein said vehicle further comprises a clutch system interposed between said propulsion mechanisms and said motor arrangement for selective disengagement of said motor arrangement and said propulsion mechanisms.

* * * * *